Figure 1:
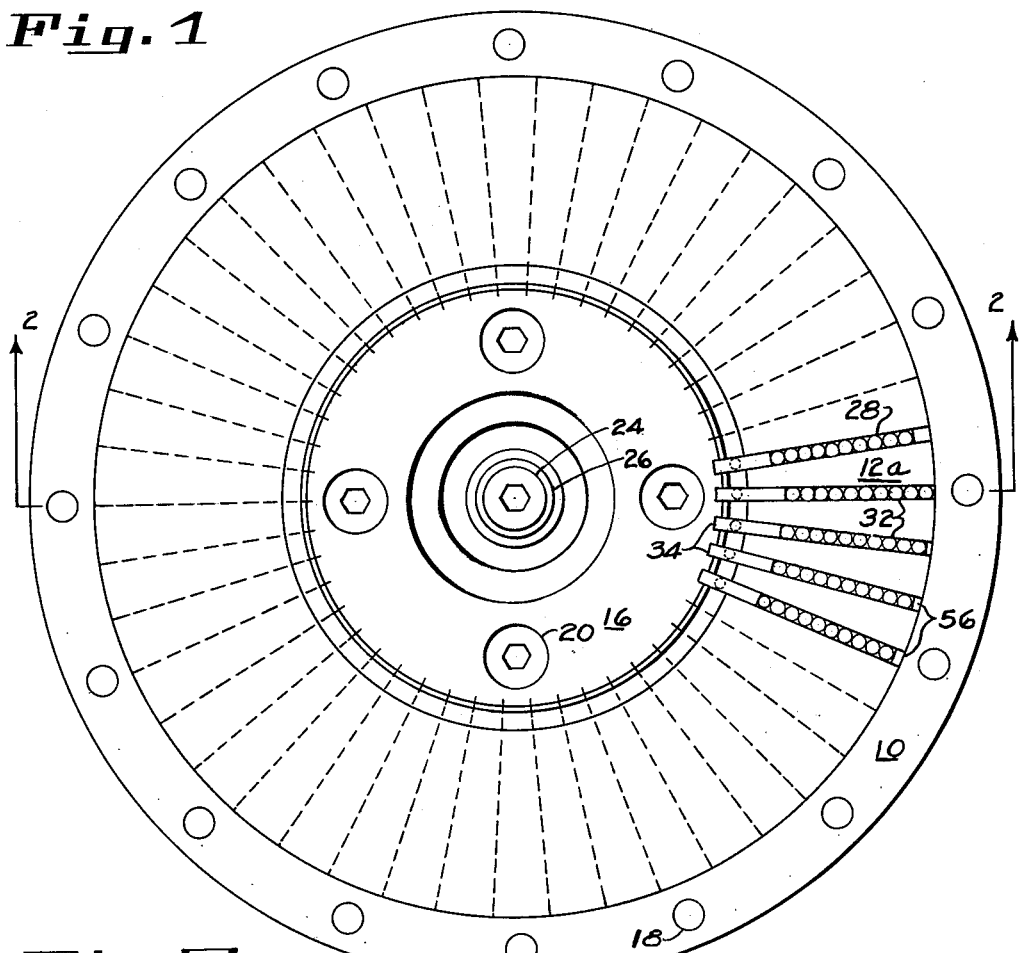

Oct. 8, 1963 R. N. CLIFTON ETAL 3,106,011
MILLING CUTTER
Filed Nov. 6, 1961 2 Sheets-Sheet 1

INVENTOR.
RICHARD N. CLIFTON
BY DONALD O. LAWLESS
ATTORNEYS

United States Patent Office 3,106,011
Patented Oct. 8, 1963

3,106,011
MILLING CUTTER
Richard N. Clifton and Donald O. Lawless, Cincinnati, Ohio, assignors to The Cincinnati Milling Machine Co., Cincinnati, Ohio, a corporation of Ohio
Filed Nov. 6, 1961, Ser. No. 150,298
8 Claims. (Cl. 29—105)

This invention relates to a metal cutting tool and is particularly adapted for use in a finishing operation.

A grinding wheel cutting surface is made up of a great number of small exposed abrasive grains which are randomly oriented. These abrasive grains have irregular cutting edges which provide the metal removal means of the grinding wheel. Since they are randomly oriented, the cutting edges and rake angles are randomly positioned relative to the surface being finished. While the grinding wheel is capable of producing a fine finish due to the number and size of the abrasive grains, the rate of removal of a given amount of metal from a workpiece is relatively slow since the grains may be scraping, dragging, or freely cutting. In constrast, a milling cutter has a comparatively few, large cutting teeth which are carefully spaced and oriented to produce a cutting tool with the correct rake angle and clearance to produce the optimum chip flow at each tooth. The surface finish resulting from a milling operation is not usually as fine as a ground surface finish but the rate of metal removal is considerably higher.

Therefore an object of this invention is to provide a metal cutting tool which combines the advantages of both a grindwheel and a milling cutter in that a large number of teeth may be used but that the teeth are carefully oriented to produce the same cutting edge, clearance, and rake angle for each tooth.

Another object of this invention is to provide a cutter having the advantages of a grinding wheel but which has the property of remaining relatively free from clogging by chips during use.

Other objects and advantages of the present invention should be readily apparent by reference to the following specification, considered in conjunction with the accompanying drawings forming a part thereof, and it is to be understood that any modifications may be made in the exact structural details there shown and described, without departing from or exceeding the spirit of the invention.

In the preferred form, this invention utilizes a face type cutter body having slots or recesses therein to hold the cutting teeth. Each tooth is in the shape of a smooth cylinder of extremely hard material having a plane end face which, with the peripheral surface of the cylinder, defines a substantially circular cutting edge. Each slot in the cutter holds a plurality of these teeth or tool bits and each bit is of the same length and received at the same selected angle to extend the same distance from the cutter. The angle at which the bits are received provides the rake angle for each bit. The teeth of the preferred cutter are removable from the cutter body to facilitate replacement with other teeth of the same shape when the teeth become worn beyond repair by sharpening.

Figure 2:
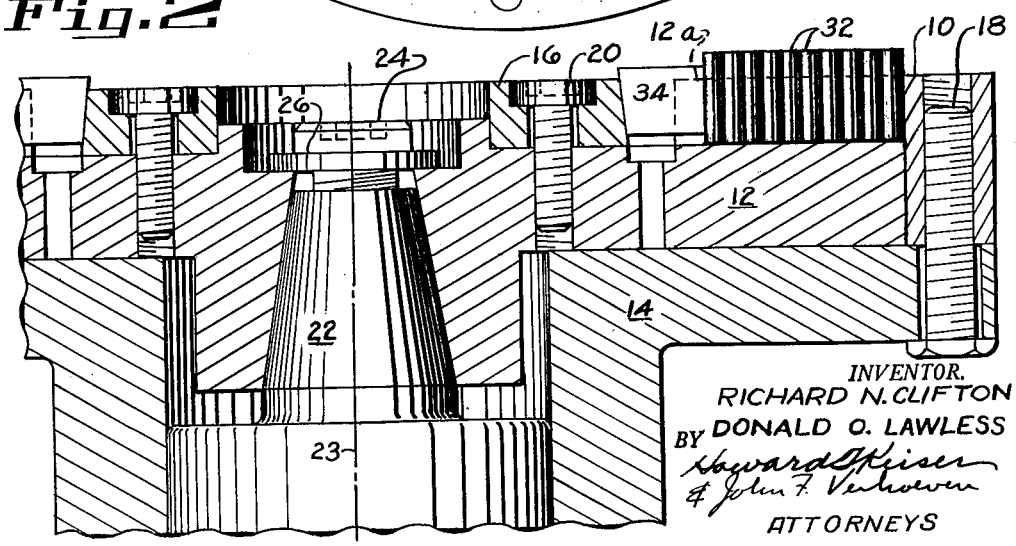
Figure 5:
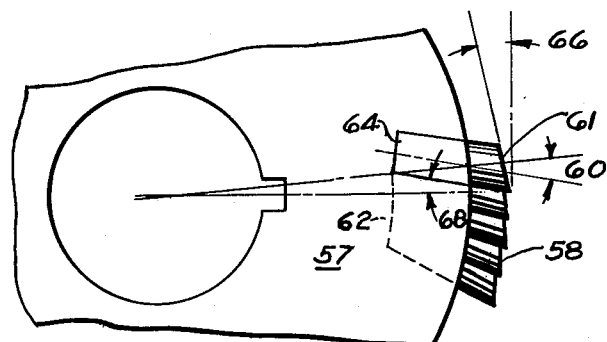
Figure 4:
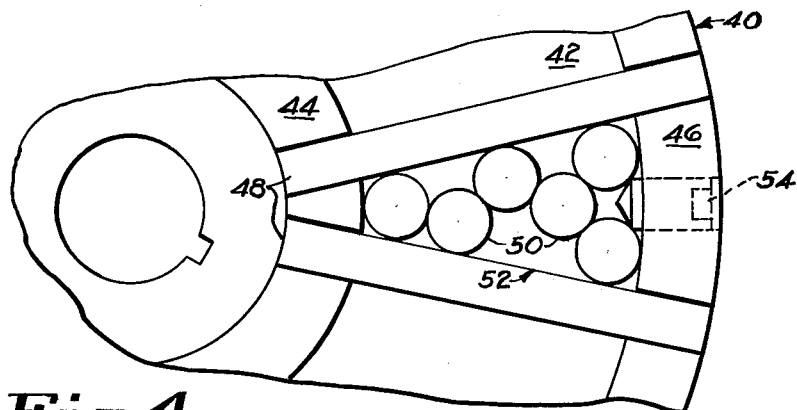
Figure 3:
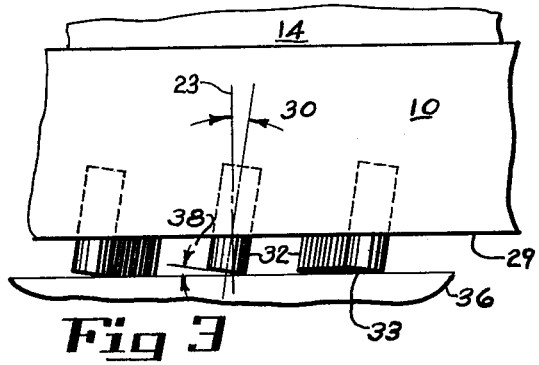

A clear understanding of the construction of this invention may be obtained from the following detailed description and the attached drawings wherein:

FIG. 1 is a plan view of a face type cutting tool.
FIG. 2 is a sectional view of the cutting tool of FIG. 1 on line 2—2 thereof.
FIG. 3 is a partial side elevation of the cutting tool of FIG. 1.
FIG. 4 is a partial plan view of a face type cutting tool showing an alternate form therefor.
FIG. 5 is a partial end view of a peripheral type cutting tool.

A face type cutting tool is shown in FIGS. 1 and 2. The body of the cutter is fabricated of four members, a ring member 10, a disc portion 12, a backing plate 14, and a wedge ring 16. In fabrication, the disc 12 is cooled while the ring 10 is heated. The two members 10, 12 are then placed together and when their temperatures are equalized, they are firmly united. The ring and disc members 10, 12 are then attached to the backing plate 14 by means of machine screws 18 which extend through the backing plate 14 into the ring 10. The wedge ring 16 is fixed to the disc member 12 by machine screws 20. The cutter body is adapted to be fixed on the end of a spindle 22 by the screw 24 and washer 26. The spindle 22 is supported in a machine tool (not shown) for rotation thereby on an axis 23.

Recesses are formed in the cutter body to receive the tool bits which are the teeth of the cutter. The cutter in FIGS. 1 and 2 has recesses in the form of slots 28 in the face 29 of the cutter body. The slots 28 are defined by the space between rib portions 12a of the disc member 12 and extend radially inward from the ring member 10. The sides of the slots 28 are inclined or slanted into the cutter body at an angle 30 (FIG. 3) relative to the axis 23 of the machine tool spindle which is normal to the face of the cutter from which bits 32 extend. A row of bits 32 is received in each of the slots 28 in the face of the cutter body. The slanting sides of the slots 28 are used as aligning surfaces by which the bits 32 are oriented on a rake angle, the angle of the sides then defining the rake angle of the bits. (A few of the bits 32 and slots 28 are shown in FIG. 1 and the balance are represented by the broken lines for simplicity.) The clamping force holding the bits 32 in the slots 28 is provided by wedges 34 driven between the row of bits 32 and the wedge ring 16.

The shape of the bits 32 and their orientation to present a cutting edge to a workpiece is best shown in FIG. 3. Each of the bits 32 is cylindrically shaped and extends from the face of the cutter body the same distance as the others. They are composed of a very hard material as, for example, sintered tungsten carbide, cemented aluminum oxide, or other of the extremely hard materials generally known in the tool industry as ceramic cutting materials. The bits 32 are relatively small in diameter, the bits 32 of the cutter shown in FIG. 1 being in the order of size of 3/32 of an inch in diameter. The bits 32 extend from the cutter body toward the flat surface of a workpiece 36. Each end face 33 of the bits 32 is a flat surface and forms an angle 38 with the plane surface of the workpiece 36. In the example shown, the angle 38 is equal to the angle 30 since the end faces of the bits 32 are square relative to the cylindrical peripheral surface of the bits. The angle 38 forms a clearance space behind the active portion of the cutting edges of the bits 32. The cutting edge of each bit 32 is formed by the intersection of the flat end face 33 and peripheral surface of each bit 32. As viewed in FIG. 3, the tool bits 32 are moved from left to right relative to the workpiece 36 when the cutting tool is rotated. The leading portion of the cutting edge of the bits 32 extends the greatest distance from the cutter body and is the active portion which removes the metal chips from the workpiece. Each of the bits 32 presents a portion of its cutting edge on that portion is in the form of a rounded point. The entire cutter presents a great number of these points and each of the points is the same as the others. The axial rake of the bits is in the negative direction since there is no undercut, the rake angle being equal to the angle 30. The chips formed during cutting flow from the cutting edge on the smooth peripheral surfaces of the bits and the bits tend to remain free of attached chips at the cutting edge.

An alternate form of face cutting tool is shown in FIG. 4. A body 40 has an annular channel 42 machined therein leaving the concentric ring portions 44, 46 extending around the face. Radial rib members 48 are fixed between the rings 44, 46 and slanted on a slight angle to define a rake angle to hold the cutting bits 50 received therebetween on the same angle to provide the axial rake angle as is provided for the bits 32 in FIG. 3. The bits 50 in this alternate form of cutter in FIG. 4 are randomly spaced and are not necessarily spaced the same in each of the wedge shaped slots 52 formed between the rib members 48 in the cutter body 40. They will be parallel and have the same rake and clearance angles as determined by the inclination of the sides of the slot formed by the rib members 48, however. The bottom of the channel 42 provides a flat locating surface on which the inserted bits 50 that are of equal length are positioned. As shown, a dog point screw 54 extends through the outer ring portion 46 and is tightened against the bits 50 to provide a clamping force to hold the bits 50 in the body 40. The bits 50 are the same cylindrical shape as the bits 32 shown in FIG. 3 and may be made of the same material.

With the in-line arrangement of bits 32 as shown in FIGS. 1 and 2, resharpening of the cutting edges is possible while the bits 32 remain clamped in the slots 28 since the end faces 33 of each bit 32 of each row are located on a line in a single plane. The bits 50 shown in FIG. 4 which are randomly spaced but similarly oriented are not adapted for resharpening in the cutter body 32. To resharpen the bits 50 of the cutter in FIG. 4, the bits 50 would have to be removed and then ground so as to preserve the equality of length. The sharpened bits 50 would then be re-inserted. The most practical form of the bits 50 for use in the cutter shown in FIG. 4 would have end faces perpendicular to the longtudinal axis of the bits 50 and would be received in the body 40 to provide a negative axial rake, thereby eliminating the problem or repositioning the bits 50 other than to equal depth in the body 40. Such resharpening could nevertheless be simply and accurately done with a minimum of time. Also, it is pointed out that with tool bits which are relatively square between the end face and longitudinal axis, the bits need not be resharpened as frequently since they could be released, rotated to present another portion of the cutting edge as the leading edge and then reclamped. The in-line arrangement of bits in the cutter body and sharpening in place will provide a more accurate cutting tool, however, since the alignment of the end faces may be more easily controlled.

The cutters shown in FIGS. 1 and 4 are finishing cutters and its is apparent that a great number of teeth are available and that each tooth has a controlled placement in the cutter body. Thus the cutters have features of both grinding wheels and milling cutters. It has been found that a cutting tool as shown in FIG. 1 having a set of cemented aluminum oxide bits of 3/32 inch diameter received therein at a negative rake angle of 6 degrees, extending therefrom 1/16 of an inch, and rotated to produce a cutting speed of 6000 feet per minute will produce a surface finish of 10 microinches (root mean square) when a .003 inch depth of cut is taken in materials such as brass, cast iron, and steel.

Workpieces might be fed relative to the cutters in FIGS. 1 and 4 in either the axial direction (parallel to the axis of cutter rotation) or in a transverse direction (perpendicular to the axis of cutter rotation). In the axial feed situation, the bits 32, 50 would necessarily have to be staggered from slot to slot to cut in overlapping areas to produce the best possible finish. The bits 50 in FIG. 4 are randomly spaced relative to one another in the slots 52 although they are oriented in the same manner relative to the cutter body 40. Therefore the overlap is inherent in the cutting bits 50. However, in the in-line bit cutter of FIG. 1, the staggering of the bits 32 is provided by shims 56 and by varying the size of the wedges 34. In the case of traverse feed of a workpiece, the staggering of the bits 32, 50 is not as critical since the required overlap of cut may be obtained by adjustment of the relative feed movement between the cutter and a workpiece.

The end view of the peripheral type cutting tool in FIG. 5 shows a cutter body 57 in which cylindrical bits 58 are inserted at an angle 60 to the cutter radius, as indicated, to provide a positive radial rake angle 68 or undercut. The slot 62 in which the bits 58 are received extends in a helical direction across the periphery of the body 57. The bits 58 of this described cutter are held in the slot 62 by a matrix 64 which may be, for example, a cast light metal or an epoxy resin base substance having the required strength and heat resistance qualities necessary to hold the bits 58 in the slot 62 during metal cutting operations. Such compounds are well known in the industry and commercially available. A similar matrix might be used to hold the bits in the face type cutters previously described. The bits 58 are in an in-line formation to facilitate sharpening of the cutting edge while the bits 58 remain in the body 57. When fixed in the body 57 in a matrix, the bits 58 need not be in an abutting relationship. The clearance behind the active portion of the cutting edge is provided in this example by having the end faces 61 of the bits 58 at an angle 66 relative to the tangent of the circle traced by the leading point of the cutting edge of the bits 58. It is noted however, that only a single sharpening setup and grinding operation would be required to both sharpen the cutting edge and provide the bit clearance behind the cutting edge. The bits 58 are staggered from row to row to provide the overlap of cut necessary in producing a smooth surface in use of the cutter of FIG. 5.

The cutting edge of the bits 58 in the example of FIG. 5 would not be exactly circular since the end face 61 and the periphery of the cylinder do not intersect at right angles, the result being an edge following an elliptical curve. For purposes of this application, the slightly elliptical edge is considered as being substantially circular. Also, the end face 61 of the bits 58 may have a very slight curve rather than being exactly plane if sharpened in place in the body 56 but this curve is of little consequence and the end faces 61 of the bits 58 may be considered as substantially plane and flat.

While the face cutters of FIGS. 1 and 4 have been described as having negative rake cutting bits, the rake angle might also be positive if desired and a clearance provided as in the peripheral cutter of FIG. 5, especially in the cutter of FIG. 1 where the bits are in an in-line arrangement. Likewise, the peripheral cutter of FIG. 5 might be constructed with a negative rake. It is noted that there is an inherent advantage in the negative rake cutters in that the strength of the cutting edge is increased due to the added bulk of the bit behind it. The smooth round peripheral surface aids the clip flow and the use of the negative rake is advantageous with this type of cutter in many materials where a positive rake might ordinarily be used with a straight face type of cutter tooth to achieve an efficient chip flow. The negative rake form offers the additional advantage that the end face of the bit may be square relative to the length of the bit and in the replaceable bit type cutter such a bit may be rotated and turned end for end to provide a new cutting edge without resharpening. Such a form also facilitates sharpening of the bits while separated from the cutter body.

What is claimed is:

1. A metal cutting tool adapted for finishing a surface of a workpiece, said tool comprising a body adapted for mounting on a machine tool spindle for rotation on an axis and having a plurality of plane sided slots therein, a plurality of cylindrically shaped, axially upstanding, hard cutting bits received in each of said slots, each bit having one end extending out of the slot and having a cutting edge defined by the intersection of the peripheral surface and the face of said one end of the bit, and means to rigidly hold the bits against one another in each of said slots.

2. A metal cutting tool adapted for finishing a surface of a workpiece, said tool comprising a body adapted for mounting on a machine tool spindle for rotation on an axis and having a plurality of slots therein, each of said slots having plane sides inclined into the cutter body to provide surfaces for orienting cutting bits at a predetermined rake angle, a plurality of cylindrically shaped, axially upstanding, hard cutting bits received in each of said slots, each of said bits having one end extending out of the slot and having the end face of said one end of the bit intersecting with the peripheral surface of the bit to define a cutting edge and a clearance space therebehind, the bits of each slot in alignment with the inclined sides of the slot, and means rigidly to clamp the bits of each slot against one another to hold said bits in said slots.

3. A metal cutting tool adapted for finishing a surface of a workpiece, said tool comprising a body adapted for mounting on a machine tool spindle for rotation on an axis, said body having a face perpendicular to the axis of rotation, and said face having a plurality of radial slots therein, each of said slots having plane sides inclined relative to the axis of rotation to define a rake angle, a plurality of cylindrically shaped, axially upstanding, hard cutting bits received in each of said slots, each of said bits having one end extending out of the slot and having the end face of said one end of the bits intersecting with the peripheral surface of the bit to define a cutting edge and a clearance space therebehind, the bits of each slot in alignment with the inclined sides of the slot, and means rigidly to clamp the bits of each slot against one another to hold said bits in said slots.

4. A metal cutting tool adapted for finishing a surface of a workpiece, said tool comprising a body adapted for mounting on a machine tool spindle for rotation on an axis and having a face perpendicular to said axis of rotation, said face having a plurality of radial slots therein, each of said slots having plane sides inclined relative to the axis of rotation to define a negative rake angle, a plurality of cylindrically shaped, axially upstanding, contiguous hard cutting bits received in each of said slots, each of said bits having one end extending out of the slot and having the end face of said one end square relative to and intersecting with the peripheral surface of the bit to define a cutting edge, the bits of each slot in alignment with the inclined sides of the slots, and means rigidly to clamp the bits of each slot together to hold said bits in said slots.

5. A metal cutting tool adapted for finishing a surface of a workpiece, said tool comprising a body adapted for mounting on a machine tool spindle for rotation on an axis and having a face perpendicular to the axis of rotation, said face having a plurality of radially disposed flat-bottomed slots therein, each of said slots having plane sides slanting inwardly at an angle from said face in the same direction to define a negative rake angle, an array of cylindrically, axially upstanding, shaped contiguous hard cutting bits of equal length received in each of said slots, each of said bits having one end received against the bottom of the slot and the other end extending out of the slot and having an end face of said other end of the bit square relative to and intersecting with the peripheral surface of the bit to define a circular cutting edge, and clamping mechanisms to apply forces to the ends of said array of bits in each slot to rigidly hold said bits together in said slots.

6. A metal cutting tool adapted for finishing a surface of a workpiece, said tool comprising a body adapted for mounting a machine tool spindle for rotation on an axis and having a face perpendicular to said axis of rotation, said face having a plurality of radially disposed ribs, each of said ribs having plane sides slanted inwardly to said body at an angle from said face to define a rake angle, the spaces between said ribs defining cutting bit recesses, a plurality of cylindrically shaped, axially upstanding, hard cutting bits received in each of said recesses in an in-line and contiguous pattern, each of said bits having one end extending out of the recess and having a peripheral surface and a plane end face of said one end intersecting to form a substantially circular cutting edge, the bits of each recess in alignment with sides of said ribs, and means rigidly to clamp the bits of each recess together to hold said bits in said recesses.

7. A metal cutting tool adapted for finishing a surface of a workpiece, said tool comprising a body adapted for mounting on a machine tool spindle for rotation on an axis and having a face perpendicular to the axis of rotation, said face comprised of a plurality of spaced radially disposed rib portions having plane sides slanting inwardly from the face to define a negative rake angle, the space between adjacent ribs defining a cutting bit recess having a flat bottom square with said sides, an inline array of cylindrically shaped, axially upstanding, contiguous hard cutting bits of equal length received in each of said recesses, each of said bits having one end received against the bottom of the recess and the other end extending out of the recess and having an end face of said other end square relative to and intersecting with the peripheral surface of the bit to define a circular cutting edge, and clamping mechanisms in said body to apply forces to the ends of said array of bits in each recess rigidly to hold said bits together therein, said mechanism including spacers relatively to stagger the array of bits slightly from one recess to the next recess.

8. A metal cutting tool adapted for finishing a surface of a workpiece, said tool comprising a body adapted for mounting on a machine tool spindle for rotation on an axis and having a peripheral surface concentric to said axis of rotation, said peripheral surface having a plurality of slots extending thereacross, each of said slots having parallel sides slanted inwardly from the peripheral surface to define a rake angle, a plurality of cylindrically shaped, axially upstanding, contiguous hard cutting bits received in each of said slots in an inline pattern, each of said bits having one end extending from the slot and having a peripheral surface and an end face of said one end intersecting to form a substantially circular cutting edge, the bits of each slot in alignment with the sides of the slot to hold said bits on said rake angle, and means rigidly to hold said bits in said slots.

References Cited in the file of this patent

UNITED STATES PATENTS

| 104,055 | Munro | June 7, 1870 |
| 833,261 | Tardif | Oct. 16, 1906 |
| 2,586,955 | Kaiser | Feb. 26, 1952 |
| 2,893,110 | Gibson | July 7, 1959 |
| 2,958,119 | Stansfield | Nov. 1, 1960 |

FOREIGN PATENTS

| 509,202 | Germany | Oct. 9, 1930 |
| 537,399 | Great Britain | June 19, 1941 |
| 1,174,641 | France | Nov. 3, 1958 |